(12) United States Patent
Gallagher

(10) Patent No.: US 6,856,702 B2
(45) Date of Patent: Feb. 15, 2005

(54) SYSTEM AND METHOD FOR SELECTING AN IMAGE PROCESSING PATH USING ESTIMATED APPEARANCE OF NOISE

(76) Inventor: Andrew C. Gallagher, Eastman Kodak Company 343 State St., Rochester, NY (US) 14650

( * ) Notice: Subject to any disclaimer, the term of this patent is extended or adjusted under 35 U.S.C. 154(b) by 482 days.

(21) Appl. No.: 09/894,762

(22) Filed: Jun. 28, 2001

(65) Prior Publication Data

US 2003/0026492 A1 Feb. 6, 2003

(51) Int. Cl.⁷ ................................................. G06K 9/40
(52) U.S. Cl. ........................ 382/254; 382/252; 382/255; 382/274; 382/275; 358/3.26; 358/3.27; 358/463
(58) Field of Search ................................ 382/252, 255, 382/260, 274, 275, 263; 358/3.26, 3.27, 520, 463, 532

(56) References Cited

U.S. PATENT DOCUMENTS

| | | | |
|---|---|---|---|
| 4,518,898 A | * | 5/1985 | Tarnowski et al. .......... 315/371 |
| 4,945,406 A | | 7/1990 | Cok |
| 5,134,573 A | | 7/1992 | Goodwin |
| 5,175,775 A | * | 12/1992 | Iwaki et al. ................. 382/211 |
| 5,363,209 A | | 11/1994 | Eschbach et al. |
| 5,374,997 A | * | 12/1994 | Eschbach .................... 358/466 |
| 5,629,769 A | | 5/1997 | Cookingham et al. |
| 5,633,511 A | | 5/1997 | Lee et al. |
| 5,641,596 A | | 6/1997 | Gray et al. |
| 5,694,484 A | | 12/1997 | Cottrell et al. |
| 5,708,693 A | | 1/1998 | Aach et al. |
| 5,709,972 A | | 1/1998 | Cookingham et al. |
| 5,712,927 A | * | 1/1998 | Kim et al. ................... 382/252 |
| 5,822,453 A | | 10/1998 | Lee et al. |
| 5,923,775 A | | 7/1999 | Snyder et al. |
| 6,091,861 A | | 7/2000 | Keyes et al. |
| 6,097,470 A | | 8/2000 | Buhr et al. |
| 6,097,471 A | | 8/2000 | Buhr et al. |
| 6,205,257 B1 | | 3/2001 | Eschbach |
| 6,344,640 B1 | * | 2/2002 | Rhoads ..................... 250/201.9 |

FOREIGN PATENT DOCUMENTS

EP        1063611        12/2000

OTHER PUBLICATIONS

Bartleson, Predicting Graininess from Granularity, *The Journal of Photographic Science*, vol. 33, 1985, pp. 117–126.

Maier et al., The Relationship Between Graininess and Granularity, *SPSE's 43rd Annual Conference Proceedings*, SPSE, Springfield, VA, 1990, pp. 207–208.

* cited by examiner

*Primary Examiner*—Bhavesh M. Mehta
*Assistant Examiner*—Yosef Kassa
(74) *Attorney, Agent, or Firm*—Thomas H. Close

(57) ABSTRACT

A method and system for processing an image based on noise appearance in the image, includes the steps of and means for: forming a noise table representing noise magnitude vs. intensity of the image; providing a plurality of potential image processing paths, each path having at least one image transform; modifying the noise table according to the image transform(s) in the at least one image processing path to produce an output noise table, generating a noise metric from the output noise table, said noise metric representing the noise appearance of the image processed by the at least one image processing path; selecting one of the plurality of potential image processing paths based on the noise metric; and applying the selected image processing path to the image.

25 Claims, 9 Drawing Sheets

SYSTEM AND METHOD FOR SELECTING AN IMAGE PROCESSING PATH USING ESTIMATED APPEARANCE OF NOISE

FIELD OF THE INVENTION

The invention relates generally to the field of digital image processing and, more particularly, to a method for selecting an appropriate image processing path for each image that results in an output image having acceptable noise appearance.

BACKGROUND OF THE INVENTION

In designing an imaging system, it is important to be able to determine the magnitude of the level of image degradation to be expected in the final image as viewed by the observer. Understanding the magnitude of the image degradations due to grain is also important to the use of the image reproduction system and can have a major impact on the selection of key elements for use in the imaging chain.

In an imaging system, the variations in otherwise uniform responses to exposing light are referred to as noise. In a traditional photographic system, these variations in the density can be observed through physical measurement by measuring the optical density of photo graphic materials, such as film or paper, with a microdensitometer. The root mean square (rms) value or standard deviation is used as a measure of the variation in density of an otherwise uniform area. This value is referred to as the granularity. An output image is perceived by an observer and the perception of these unwanted, random fluctuations in optical density are called graininess or noise appearance. Thus, the physically measured quantity of granularity is perceived by the observer as a level of graininess.

Various efforts have been made to estimate and quantify the appearance of noise, or graininess, in an output image. Bartleson, in "Predicting Graininess from Granularity," J. Phot. Sci., Vol. 33, No. 117, 1985, showed that graininess is dependent upon the granularity at a visual print density of 0.8. He determined the following relationship between the graininess $G_i$ and the granularity $a\sigma_v$ $$G_1 a * \log(\sigma_v) + b$$

where a and b are constants.

Bartleson's work made it possible to estimate the graininess that a given imaging system will produce. Unfortunately, the graininess of different images produced from a common imaging system can have a huge variation. This is because any image transform that is applied to create the output image can alter the visibility of noise in a system. For example, a photographic negative can be imaged with an enlarger onto photographic paper. However, the noise appearance of the output print is highly dependent on the exposure given to the negative. Thus, the noise appearance of any given output image produced with a given imaging system may be quite different than the estimate enabled by Bartleson's work. Bartleson's work does not aid an imaging system in determining which image processing path to apply to a particular image.

In U.S. Pat. No. 5,641,596 issued Jun. 24, 1997, Gray et al. describe a method of determining a noise table. Noise tables describe the density dependent noise of a particular image capture device, and therefore quantify the density dependent noise of images created by the image capture device. The noise table is usually modeled as the output from a specific scanning device and image capture device (such as film.) Alternatively the noise table could represent a digital image capture, or photographic film. A noise table represents the standard deviation of noise as a function of mean code value. However, a noise table alone is not a good indicator of the visibility of noise in an output image. An imaging system's output image is a product of multiple image transforms, each of which modifies its noise characteristics. Therefore, a pre-output noise table (such as a noise table quantifying the characteristics of an image capture device) does not represent the noise characteristics of an output image.

Noise information has been used to modify parameters of a user-selected algorithm. Cottrell et al., in U.S. Pat. No. 5,694,484 issued Dec. 2, 1997, describe a method of using characteristic information (e.g. Modulation Transfer Function and Wiener Power Spectrum to characterize noise) of input and output devices, calculating an objective metric of image quality, and determining the parameters for an image transform (such as sharpening boost) by optimizing the objective metric of image quality. Cottrell et al. again make the implicit assumption that all output images produced by a common imaging system will have a similar appearance of noise. However, this is not the case. While the images produced directly from an imaging device may have similar noise and sharpness characteristics, these characteristics may be vastly modified by the image transforms that produce the output image. In addition, for many imaging systems, (for example, U.S. Pat. Nos. 6,097,470 and 6,097,471 both issued Aug. 1, 2000 to Buhr et al.) the operation of image transforms vary based on an analysis of the image. The effect of image dependent image transforms is not considered by Cottrell. Thus, the method of Cottrell could not be used to determine a preferred image processing path for each image, since all images originating from a common source and rendered with a common output device will receive identical treatment, regardless of the individual characteristics of the image.

Keyes et al. in U.S. Pat. No. 6,091,861 issued Jul. 18, 2000, describe a method of determining a sharpening parameter based on the exposure (i.e. the SBA balance) of the image. Their method also takes into account the granularity of the image and computes an expected graininess value (PGI), which is related to the granularity. However, this method does not have the flexibility to take into account the effects of the application of an image dependent image transform. Additionally, summarizing the noise on the print by using the exposure is prone to error, since even an image with a normally exposed subject can easily contain background areas that contain noise of a vastly different magnitude.

Another method of determining the noise appearance in a particular output image is to compare that output image to a set of standard noise examples arranged in a ruler. The first grain slide or ruler was designed and fabricated by Thomas Maier et al. (see for example, Maier et al., "The Relationship Between Graininess and Granularity" SPSE's 43 Annual Conference Proceedings, SPSE, Springfield, Va., pp. 207–208, 1990). C. James Bartleson determined the fundamental relationship relating the granularity and graininess.

Maier et al. produced a series of uniform neutral patches of grain at the same average density with increasing amounts of grain using a digital simulation instrument. They then used microdensitometer measurements and the fundamental psychophysical relationship to relate the graininess to the rms granularity. Cookingham et al. produced improved grain rulers, as described in U.S. Pat. Nos. 5,709,972 issued Jan.

20, 1998, and 5,629,769 issued May 13, 1997. While such noise rulers do effectively allow for an individual to numerically quantify the appearance of noise in an output image, the process is labor intensive and requires a human observer to individually evaluate each output image. Additionally, Maier et al. do not describe a means by which a preferred image processing path is selected for each image passing through an image processing system.

In U.S. Pat. No. 6,205,257 issued Mar. 20, 2001, Eschbach describes a method by which a noise filtering image transform is applied to images which statistically appear to have high levels of noise. A noise filtering image transform is applied only to images having a contrast below a predetermined level, and only if the image is darker than a second predetermined level.

Therefore, there exists a need to select an image processing path based on an estimated noise appearance of an output image with an automatic process. These and other aspects, objects, features and advantages of the present invention will be more clearly understood and appreciated from a review of the following detailed description of the preferred embodiments and appended claims, and by reference to the accompanying drawings.

SUMMARY OF THE INVENTION

The need is met according to the present invention, by providing a method and system for processing an image based on noise appearance in the image, including steps and means for: forming a noise table representing noise magnitude vs. intensity of the image; providing a plurality of potential image processing paths, each path having at least one image transform; modifying the noise table according to the image transform(s) in the at least one image processing path to produce an output noise table; generating a noise metric from the output noise table, said noise metric representing the noise appearance of the image processed by the at least one image processing path; selecting one of the plurality of potential image processing paths based on the noise metric; and applying the selected image processing path to the image.

ADVANTAGES

The present invention has the advantage that an appropriate image processing path can be automatically selected for each image that results in an output image having acceptable noise appearance.

DETAILED DESCRIPTION OF THE INVENTION

In the following description, the present invention will be described as a method implemented as a software program. Those skilled in the art will readily recognize that the equivalent of such software may also be constructed in hardware. Because image enhancement algorithms and methods are well known, the present description will be directed in particular to algorithm and method steps forming part of, or cooperating more directly with, the method in accordance with the present invention. Other parts of such algorithms and methods, and hardware and/or software for producing and otherwise processing the image signals not specifically shown or described herein, may be selected from such materials, components and elements known in the art. Given the description as set forth in the following specification, all software implementation thereof is conventional and within the ordinary skill in such arts.

It is instructive to note that the present invention can be used to select an image processing path based on estimated noise appearance for either an analog image in an analog imaging system or a digital image in a digital imaging system. An analog image is an image represented in a physical medium, such as a photographic negative or a photographic positive (slide), or photographic print A digital image is typically a two-dimensional array of numbers representing red, green, and blue pixel values or monochrome pixel values corresponding to light intensities. With regard to matters of nomenclature, the value of a pixel of a digital image located at coordinates (x,y), referring to the $x^{th}$ row and the $y^{th}$ column of a digital image, shall herein comprise a triad of values [r(x,y), g(x,y), b(x,y)] respectively referring to the values of the red, green and blue digital image channels at location (x,y). In this regard, a digital image may be considered as comprising a certain number of digital image channels. In the case of a digital image comprising red, green and blue two-dimensional arrays, the image comprises three channels, namely, red, green and blue spectral channels. Additionally, a luminance channel n may be formed from the color signals. The value of a pixel of a digital image channel n located at coordinates (x,y), referring to the $x^{th}$ row and the $y^{th}$ column of the digital image channel, shall herein be a single value referred to as n(x,y). In addition, in the case where the image $f$ is an analog image, then the value $f(x,y)$ represents a light intensity at a location indicated by (x,y).

Figure 1:
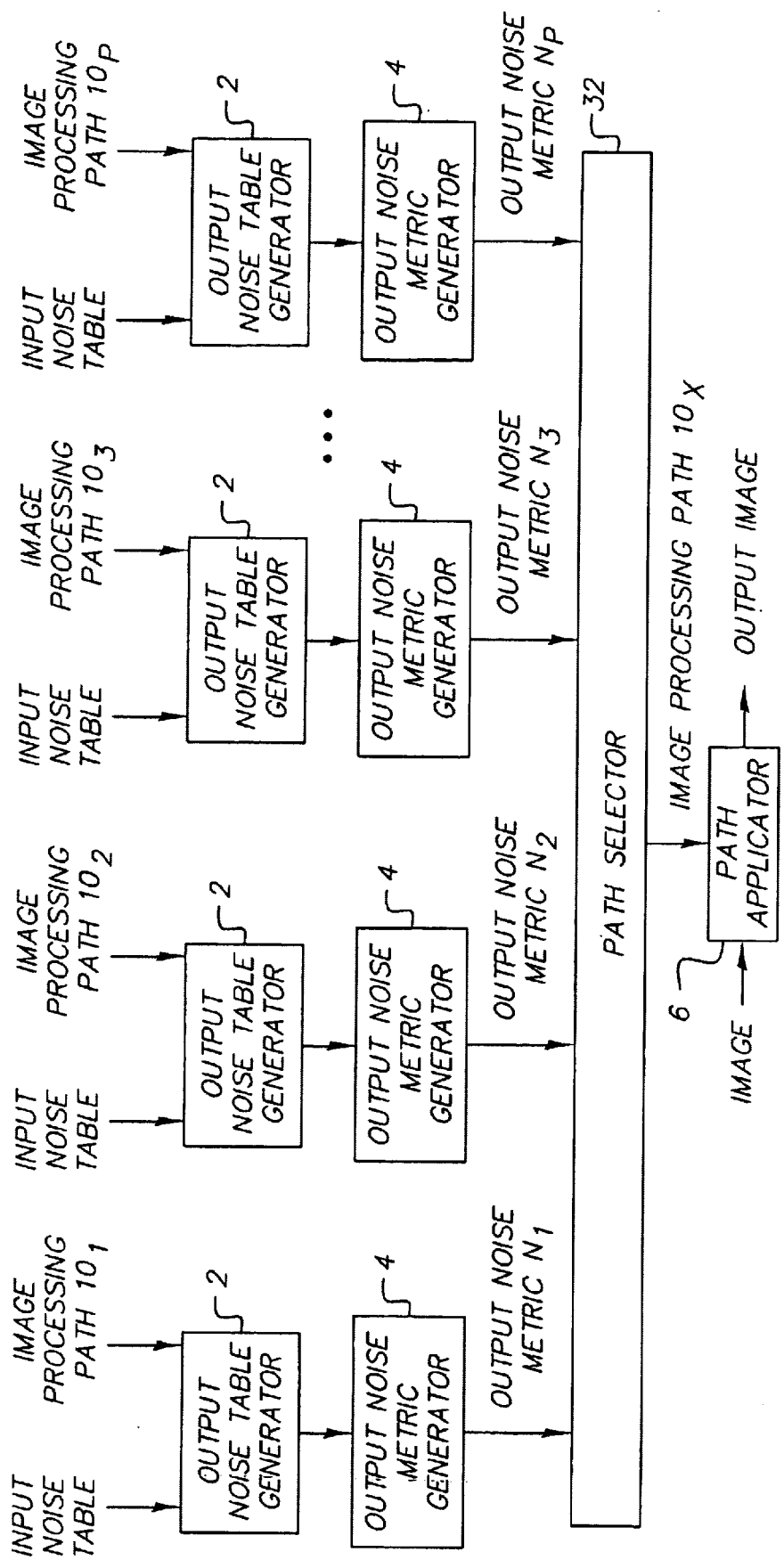
FIG. 1 is a schematic block diagram illustrating one embodiment of the present invention.

FIG. 1 illustrates the preferred embodiment of the present invention for processing an image with a specific image processing path in order to obtain an image with acceptable noise appearance. In general, the present invention allows for the selection of an image processing path which will produce an output image from the image with acceptable noise characteristics, or at least minimizes the noise appearance in the output image. Several image processing paths $10_1, \ldots, 10_p, \ldots, 10_P$ may be under consideration for use in creating the output image from a particular image. Generally, the first potential image processing path $10_1$ is referred to as the base image processing path. This image processing path was optimized in order to create output images that are generally satisfactory for a range of input images. The remaining image processing paths $10_2, \ldots, 10_P$ are alternative image processing paths which are various attempts to produce more satisfying output images than the base image processing path for at least a subset of all possible images. Image processing paths and their composition will be further described below.

An output noise table generator 2 receives an input noise table describing the relationship between the noise magnitude and intensity of the image and an image processing path, and produces an output noise table representing the noise magnitude and intensity of the image processed by the image processing path. The output noise table generator 2 applies a noise transform corresponding to each image transform 20 which makes up the image processing path 10 (see FIG. 2). The noise transforms employ the principles of functions of random variables to modify the noise table to account for the effect of Ad each image transform 20 on the noise of the image. See U.S. patent application No. 6,366,534 for an example of creating output noise tables from input noise tables.

The output noise table generator 2 then produces an output noise table which corresponds to the noise characteristics of the output image which could be created by applying the image processing path 10 to the image. The output noise metric generator 4 receives the output noise table and generates an output noise metric N1, N2, ... which is a value that represents the appearance of noise in the output image created from the image processing path. Thus, the output noise metric is a function of the input noise table and the image processing path 10.

The input noise table contains information related to the noise of an image. Generally, a separate input noise table is required to characterize each image acquisition system. For example, for digital images created by scanning color negative film, each film speed would require a separate input noise table. In U.S. Pat. No. 5,641,596 referenced above, Gray et al. describe a process by which an input noise table can be created by measuring the standard deviation of pixels from scans of regions of uniform exposure on a film. Those skilled in the art of image processing will recognize that an input noise table created in such a manner will then describe the noise characteristics for all images whose source is common to the source of the uniform exposures used for measuring noise standard deviations.

It is important to note that the present invention has the capability of selecting an image processing path $10_x$ based on estimates of noise appearance of the output images without actually examining any image. This allows the method of the present invention to select a preferred image processing path 10 without the need to process an image through each of the alternative image processing paths. Notice that the present invention uses as inputs an input noise table, and an image processing path 10. These inputs contain information about an image and its intended purpose, but themselves are non-image data. Non-image data associated with an image is often referred to as metadata. Thus, the present invention has the capability of selecting an image processing path 10 based solely on metadata analysis. Since no image analysis is required, the calculations required by the path selector 32 to select an image processing path $10_x$ can occur very quickly on a typical computer.

In a similar manner, the output noise metrics $N_1, N_2, \ldots, N_p, \ldots, N_P$ are generated, each estimating the noise appearance of an output image created with the image processing path $10_1, 10_2, \ldots, 10_p, \ldots, 10_P$, respectively. These output noise metrics are input to a path selector 32. The path selector 32 analyzes the output noise metrics $N_1, N_2, \ldots, N_p, \ldots, N_P$ and selects an image processing path based on the analysis. In general, the path selector chooses an image processing path $10_x$, where $0<X \leq P$ having an associated output noise metric which does not exceed a threshold T. The selected image processing path $10_x$ (in part or in whole) may then be applied to the image by the path applicator 6 in order to create an output image.

Figure 2:
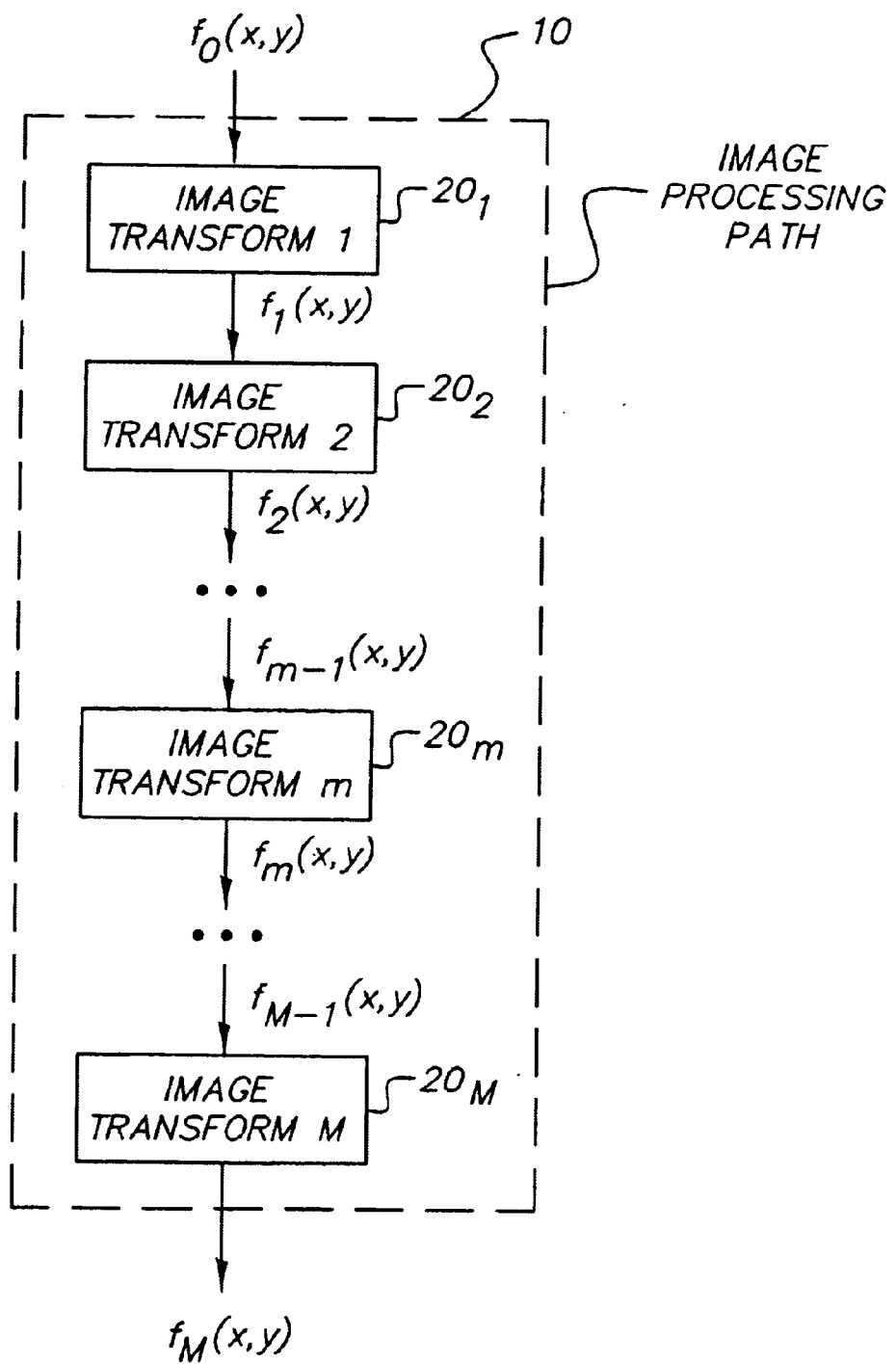
FIG. 2 is a block diagram illustrating an image processing path that is composed of image transforms.

FIG. 2 illustrates an image processing path 10 that is composed of the image transforms $20_1, 20_2, \ldots, 20_m, \ldots, 20_M$. Each image transform 20 (equivalently called an image transform step) is applied sequentially to the input image $f_0(x,y)$ to create the output image $f_M(x,y)$. The application of image transform m to the image $f_{m-1}(x,y)$ results in image $f_m(x,y)$. Each image transform 20 is an operation that is applied to the image. Examples of image transforms include the application of Look-Up-Tables (LUTs), application of balance shifts, application of matrices, application of sharpening or blurring operations, and application of the tonal response of photographic paper. While these image transforms 20 are typically mathematical operations applied to the pixel values of a digital image, the present invention need not be limited to digital imagery. For example, all of the steps required to expose a photographic negative onto photographic paper can be modeled as a series of image transforms 20. An image transform 20 can represent a physical step that occurs to an image. For example, an image transform 20 could represent the process of printing an image onto photographic paper or an image transform 20 could represent the difference between the calibration aim densities and actual achievable densities.

In addition, image transforms 20 can represent processes performed by the human visual system when the output image is viewed. Thus, the present invention is useful in selecting an image processing path 10 using estimated noise appearance for both digital and analog imaging systems. Those skilled in the art will recognize that the application of an image processing path 10 to an image by the path applicator 6 is implied by the image transform 20. For instance, the image transform steps 20 may represent mathematical operations to apply to the pixel values of a digital image. Or, the image transforms 20 may represent a physical step or the operation of the human visual system. In these cases, the image transform merely represents a process which the image will undergo by viewing the output image, and the path applicator 6 need not apply an image transform 20 representing the response of the human visual system to create an output image ready for viewing.

Referring back to FIG. 1, there are illustrated several (i.e. more than one) image processing paths $10_1, \ldots, 10_p, \ldots, 10_P$ which may be under consideration for use in creating the output image. These image processing paths $10_p$ are referred to as potential image processing paths. Generally, the first potential image processing path $10i$ is referred to as the base image processing path. This image processing path was optimized in order to create output images that are generally satisfactory for a range of input images. The remaining image processing paths $10_2, \ldots, 10_P$ are alternative image processing paths which are various attempts to produce more satisfying output images than the base image processing path for at least a subset of all possible images. In this regard, the alternative image processing paths $10_p$ may attempt to reduce the magnitude of noise appearance for images with objectionable noise levels. Those skilled in the art of image processing recognize that image processing paths $10_p$ may be constructed which reduce the appearance of noise in an output image relative to an output image created by the base image processing path $10_1$. For example, on average, darkening an image by a small amount with the image transform 20 which performs image balancing, reduces the noise appearance in images with objectionable noise. Image balancing is often performed by a scene balance algorithm (SBA) or automatic exposure determination algorithm (such as are used in high speed optical printers or in a Photo-CD scanner, see for example, U.S. Pat. No. 4,945,406 issued Jul. 31, 1990 to Cok).

In addition, an image transform 20 which performs noise reduction such as described in U.S. Pat. No. 5,708,693 issued Jan. 13, 1998 to Aach et al., can be employed with the present invention. The potential image processing paths $10_p$ shown in FIG. 1 may vary in terms of the image transforms from which the image processing path is composed, the ordering of the image transforms, or the parameters from which the image transforms are created. In the preferred embodiment, the path selector 32 determines which of the potential image processing paths to use for producing the output image. The path selector 32 outputs the selected potential image processing path $10_x$.

Figure 3:
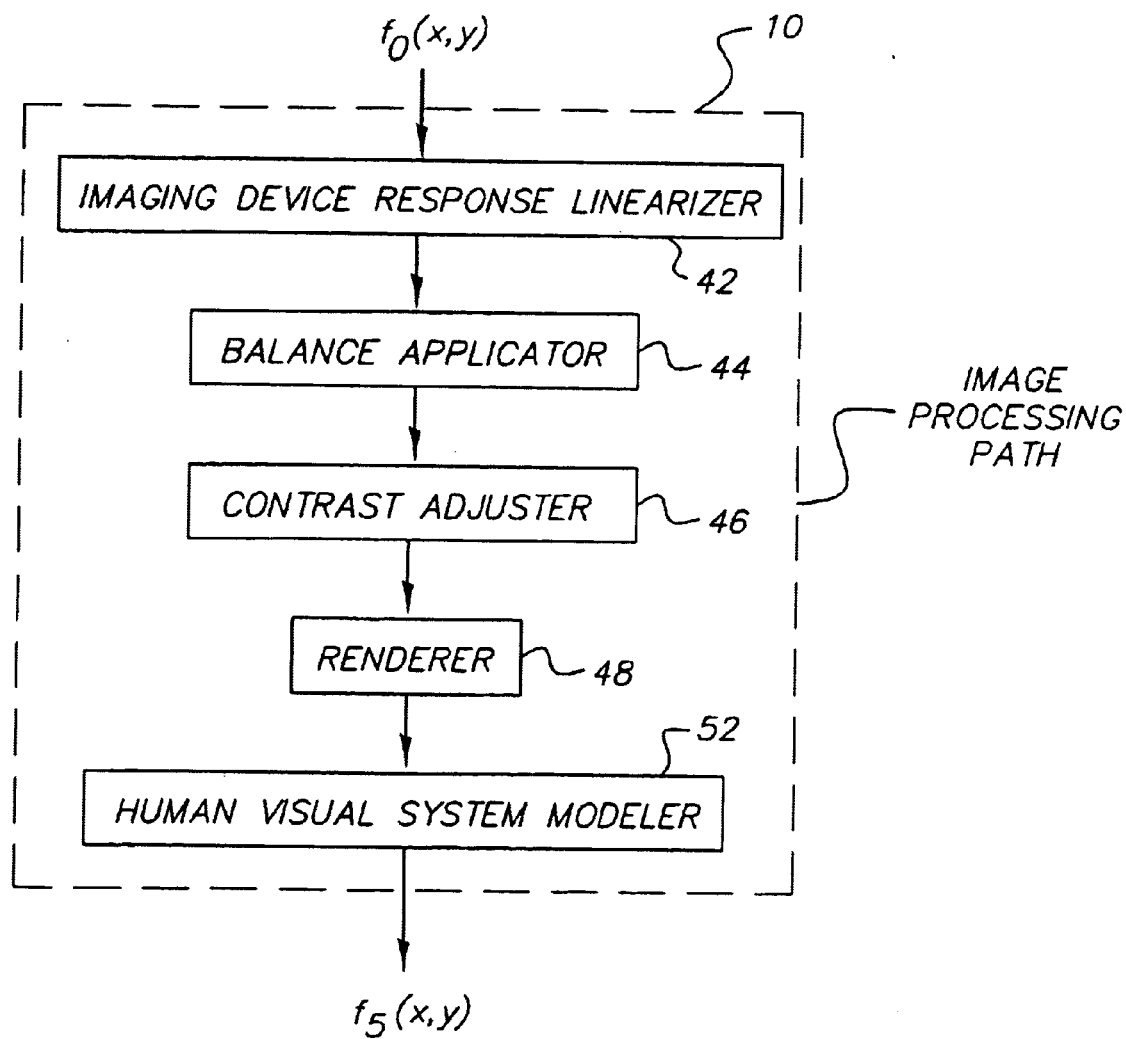
FIG. 3 is a block diagram of an example image processing path.

FIG. 3 illustrates an exemplary image processing path 10 composed of image transforms 20 designed to create an output image which is a photographic print from an input image which is a digital scan of a photographic negative. Examples of such image processing paths 10 are disclosed in U.S. Pat. Nos. 6,097,470 and 6,097,471, to Buhr et al., referenced above. First, an imaging device response is linearized 42 with an image transform 20 that applies compensation for non-linearities in the response of the imaging device. A method of correcting for the non-linearities in the response of photographic film may be implemented if the digital image is of film origin. Such a method is described in U.S. Pat. No. 5,134,573 issued Jul. 28, 1992 to Goodwin.

Next the image is balanced 44 by a transform 20 that estimates and applies balance adjustments which are required by both digital and optical imaging systems. This balance could for instance be obtained with an automatic exposure determination algorithm (such as are used in high speed optical printers or in a PhotoCD scanner, see for example U.S. Pat. No. 4,945,406, referenced above). The next image transform 20 is a contrast adjustor 46 which determines and applies tonal modifications to the image. The contrast of the image may be estimated by an automatic algorithm. In addition, the contrast of the digital image may likewise be modified to a preferred level of contrast. An example of an algorithm that estimates image contrast and provides a means of adjusting the contrast of the image is described in U.S. Pat. No. 5,822,453, by Lee and Kwon.

Figure 4A:
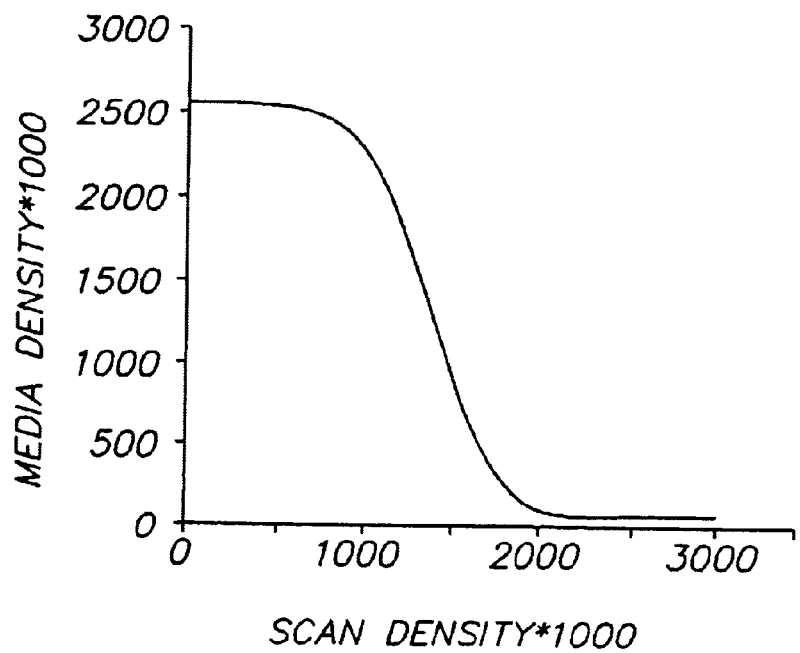
FIG. 4A illustrates a rendering LUT.

Next, the image is rendered 48 by an image transform 20 that prepares the image to be printed onto an output media. Rendering, or mapping image densities to densities on the output media occurs in both digital imaging and optical imaging and is well known to those skilled in the art. U.S. Pat. No. 6,097,470 describes image rendering. Rendering either a digital or optical image can, with good accuracy, be represented by a LUT (either one, three, or multi-dimensional.) For example, FIG. 4a shows the graph of a LUT which relates image densities (scene densities) to densities of the output media of the output image.

Figure 4B:
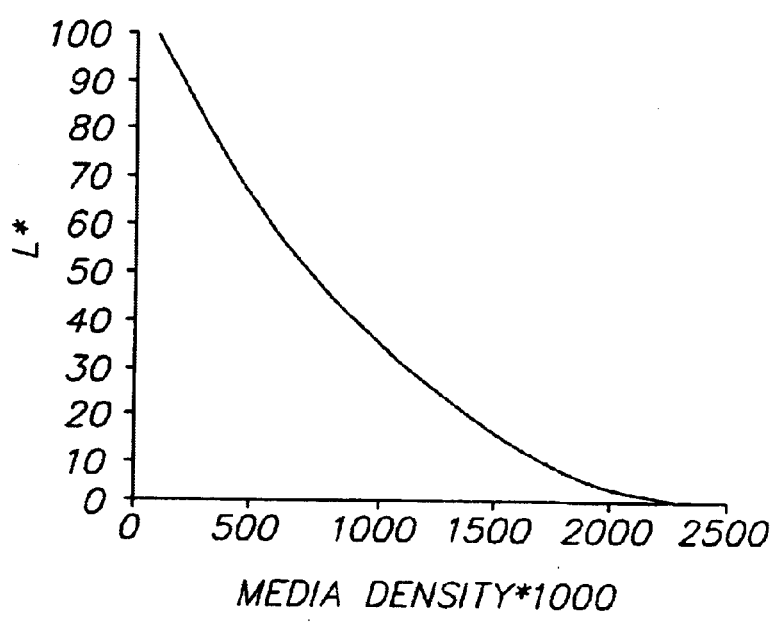
FIG. 4B illustrates a LUT which models the response of the human visual system.

Finally, the human visual system is modeled 52 by an image transform 20 that models the human perception of the output image. Since the human visual system is less sensitive to density differences occurring in dark areas of an output image than in light areas, accounting for this difference is advantageous to the quantification of noise appearance in the output image. The human visual system perception of the image can be represented by an image transform LUT relating the densities of the output image (media) to CIELAB L* values, as shown in FIG. 4B.

FIG. 5 contains several output images, all created from a common input image by using different image processing paths 10. The output image shown as FIG. 5A was created by application of an image processing path containing the following image transforms 20 (in order):

Imaging device response linearizer 42

Balance applicator 44

Contrast adjustor 46

Renderer 48

Human visual system modeler 52.

Figure 5A:
FIGS. 5A-C illustrates several example output images and their associated output noise tables.
Figure 5A:
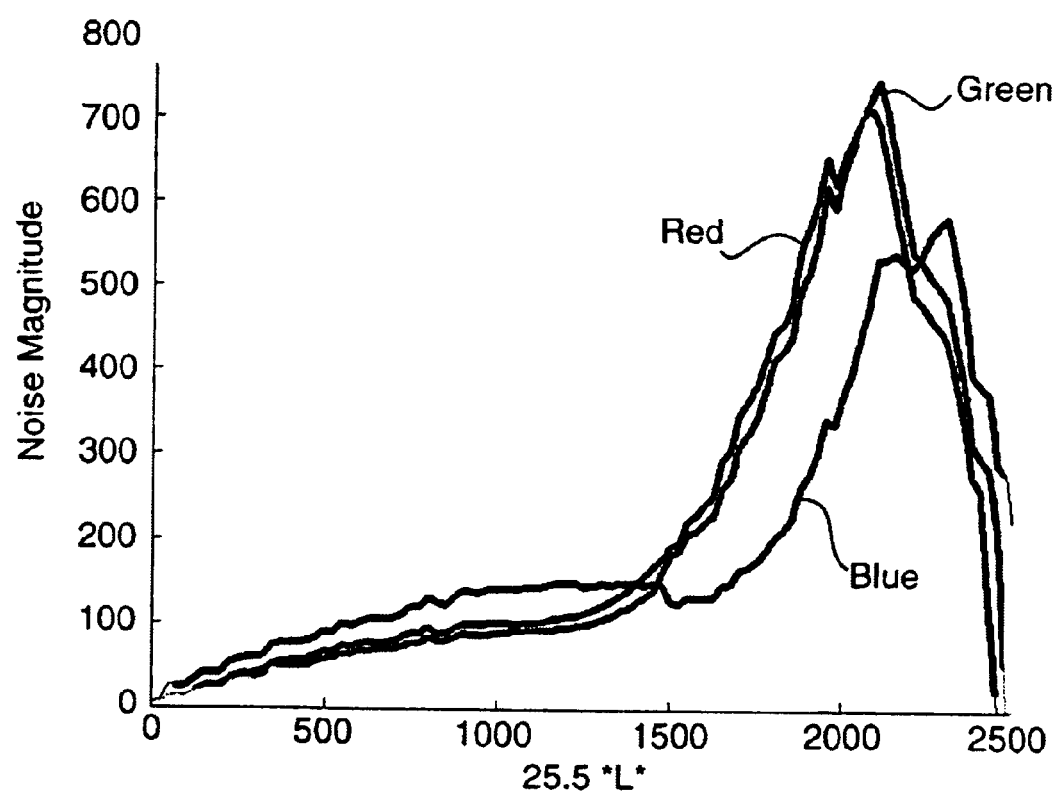

As can be seen in FIG. 5A, the image produced by this processing path appears to be quite noisy in the high density areas of the image.

Figure 5B:
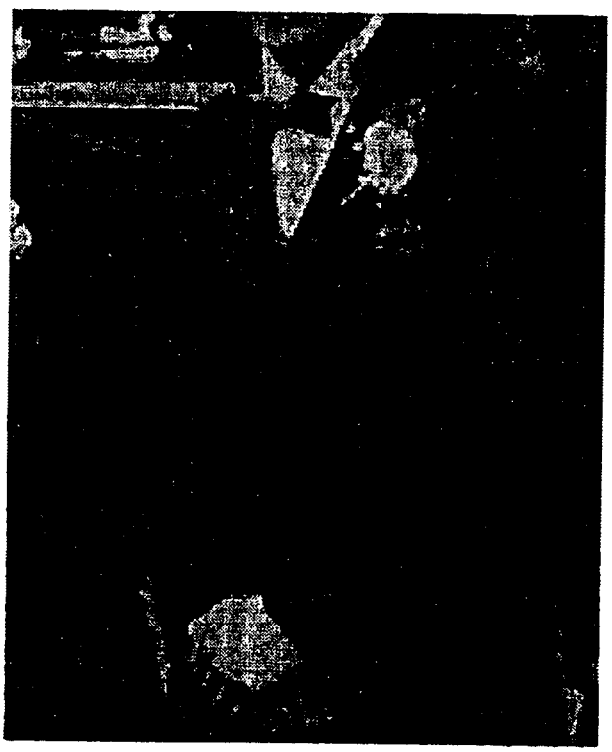
Figure 5B:
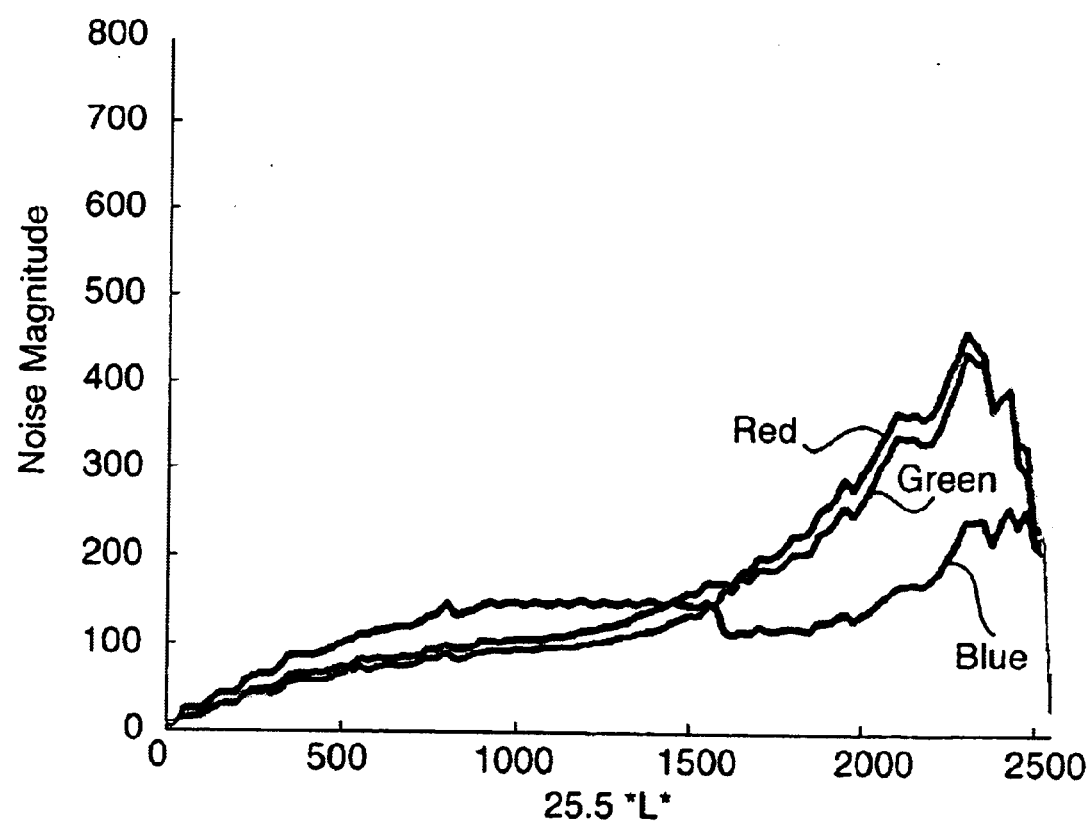

The output image shown in FIG. 5B was created from the same input image processed by the following image transforms:

Imaging device response linearizer 42

Balance applicator 44

Renderer 48

Human visual system modeler 52.

Finally, the output image shown in FIG. 5C was again created by the same input image processed by the following image transforms:

Imaging device response linearizer 42

Balance applicator 44

Renderer 48

Human visual system modeler 52.

Figure 5C:
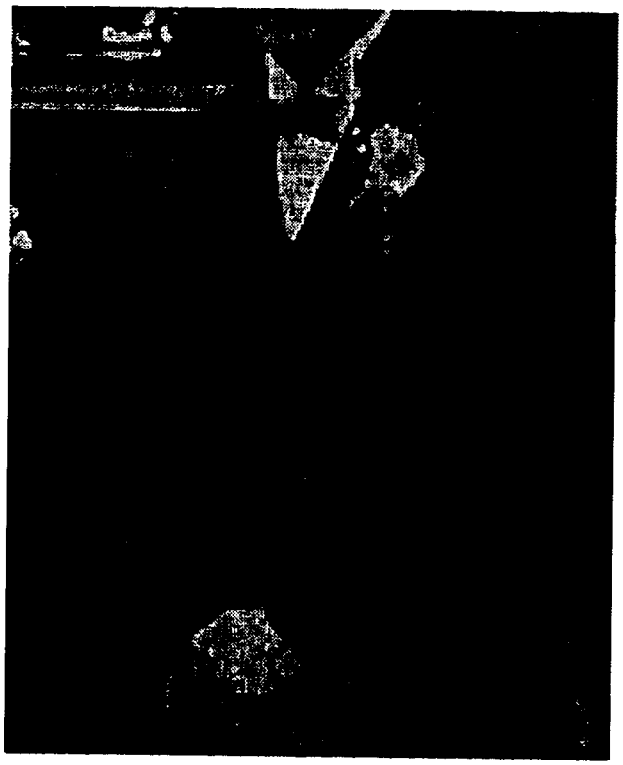
Figure 5C:
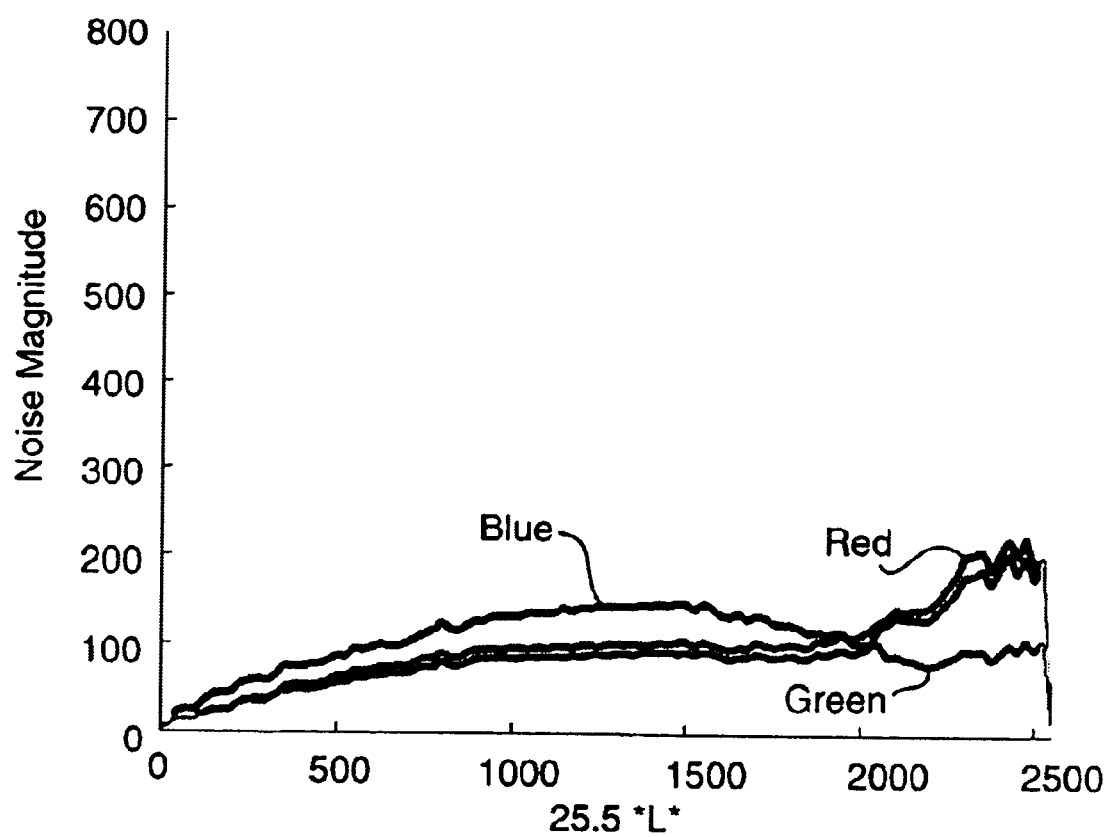

For the output image shown in FIG. 5C, the balance algorithm was forced to print the image 0.8 stops darker than recommended by adjusting a parameter on the balance algorithm. This darkening in turn reduces the output image's apparent graininess, which can easily be observed.

Referring to the images shown in FIGS. 5a–c, the output noise metrics computed according to the present invention for the image shown in FIGS. 5a, 5b, and 5c are 390, 290, and 240 respectively, corresponding to the observation of noise appearance of the output images.

The output noise metric relates to the appearance of noise in the output image. In the preferred embodiment, a larger value of output noise metric indicates an output image with a greater noise appearance. Thus, the relative ranking of two or more output images in terms of noise appearance may be determined with the output noise metrics calculated for each output image.

Referring again to FIG. 1 the output noise metrics $N_p$ are input to the path selector 32 in order that the path selector 32 may select the appropriate image processing path $10_x$ for that particular image. Let the selection of the image processing path $10_x$ for a given image a be indicated by $s(a)=X$, indicating that image processing path $10_x$ was selected for image a. In the preferred embodiment, the operation of the path selector 32 may be characterized by a set of equations:

If $(N_1>T_1)s(a)=po$ such that $N_{po}$ is the maximum of all $N_p<T_1$.

Else $s(a)=1$

Essentially, the selected path is the base image processing path $10_1$ as long as its associated output noise metric is less than threshold $T_1$. Otherwise, $N_1>T_1$ and in that case, the selected image processing path $10_x$ is the image processing path $10_p$ which has the greatest value of $N_p$ but is still less than $T_1$. If none of the image processing paths $10_p$ have an output noise metric less than $T_1$, then the selected image processing path $10_x$ is the image processing path $10p$ which has the minimum output noise metric.

Note that a potential time savings for this system is to compute the output noise metrics and alternative image processing paths $10_2, \ldots, 10_p, \ldots, 10_P$ only when necessary, i.e. only when $N_1 > T_1$. This condition is met by approximately 15% of images that I have observed.

Those skilled in the art of image processing will recognize that several of the image transforms described above rely on the image content to set the operational parameters of the image transform. To save processing time and complexity, this is usually accomplished by examining a low resolution version of the image. The output noise table would be determined by processing the input noise table according to the image transforms adjusted for the actual image. By basing the noise metric on the image itself, rather than just on the system that captured the image, the operation of the path selector 32 can vary on an image by image basis. In other words, the preferred image processing path $10_x$ for a first image may be different than the preferred image processing path $10_x$ for a second image, even in the case when the images originate from the same image capture device and are printed by the same printing device onto the same media.

It is possible to optimize the threshold $T_1$ to achieve the maximum image quality over a population of images. This can be accomplished by first selecting a set of A images (preferably $A \geq 50$) then creating output images for each of the A images according to each of the P image processing paths $10_p$. Next, human observers may assign preferences to each of the output images. These preferences can be considered to be quality data. Let $Q_{ap}$ represent the quality rating placed on the $a^{th}$ image produced with the $p^{th}$ image processing path $10_p$. The goal of the path selector 32 is for each image a, to select the image processing path $p_o$ which resulted in the highest quality rating $Q_{apo}$ for the $a^{th}$ image. Since the image processing path $10_x$ which is selected by the path selector 32 for the $a^{th}$ image is referred to as s(a), the overall average quality $A_Q$ of the population may be calculated as:

$$A_Q = \frac{1}{A}\sum_{a=1}^{A} Q_{as(a)}$$

Thus, $T_1$ may then be varied until the overall average quality $A_Q$ is maximized. The value of $T_1$ is determined by maximizing the value of $A_Q$ by optimization techniques well known in the art. By this method, the value of $T_1$ was determined to be 250. Referring back to the image shown in FIG. 5, the image processing path 10 which created the image of FIG. 5c is selected by the path selector 32.

Those skilled in the art will also recognize that the operation of the path selector 32 may be accomplished in a variety of ways. For example, the following rules may alternatively be implemented by the path selector 32 in order to determine the selected image processing path 10.

If $(N_1 < T_1) s(a) = 1$

Else $s(a) = po$ such that $N_{po}$ is the maximum of all $N_p$

Figure 6:
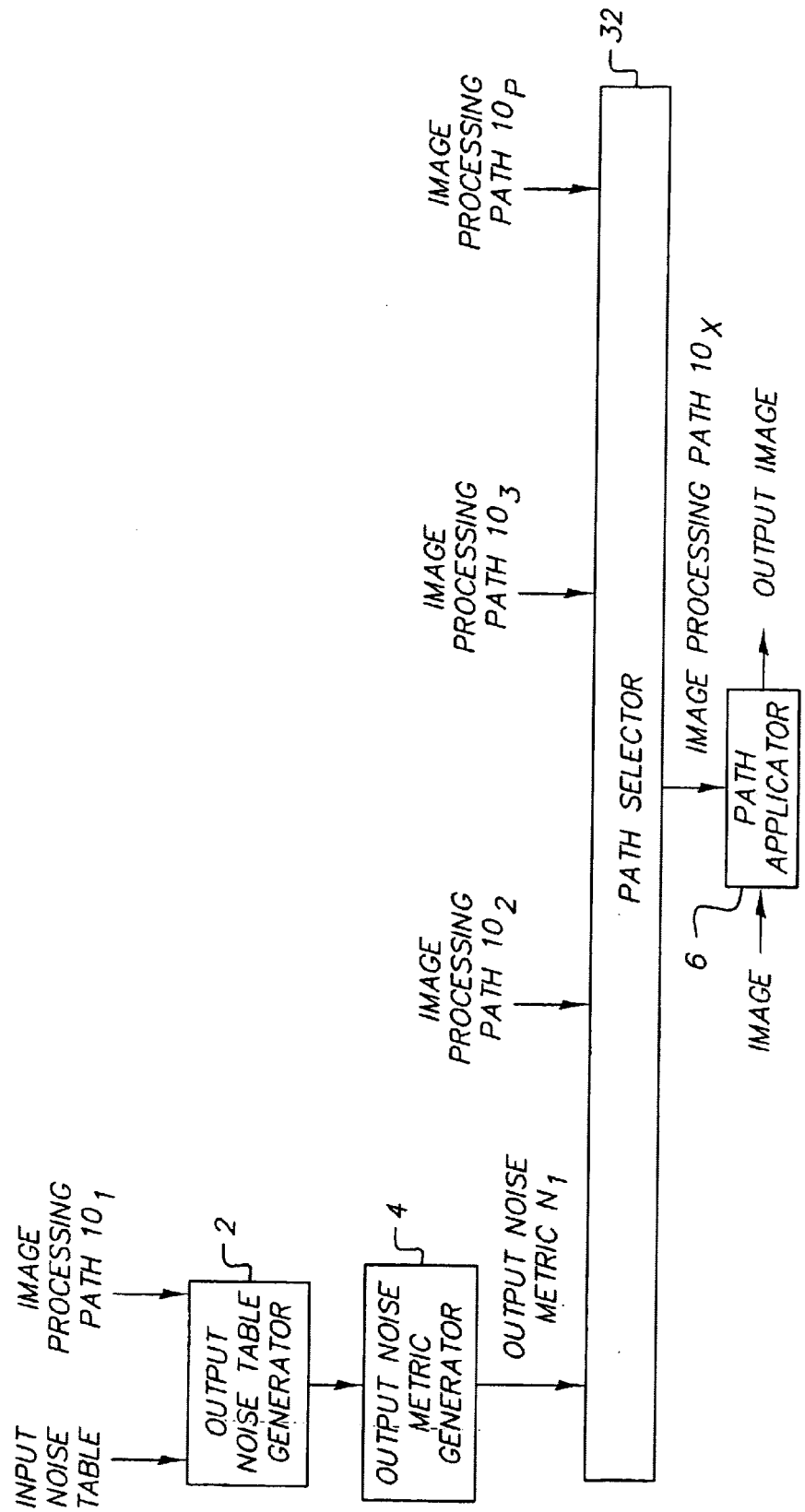
FIG. 6 is a schematic block diagram illustrating an alternative embodiment of the present invention.

Another alternative embodiment of the path selector 32 is shown in FIG. 6. In this embodiment, the output noise metric $N_1$ from the base image processing path $10_1$ is used by the path selector 32 in order to select the selected image processing path 10.

The operation of this alternative path selector 32 may be represented by an equation:

If $(N_1 < T_1) s(a) = 1$

Else if $(N_1 < T_2) s(a) = 2$

Else if $(N_1 < T_3) s(a) = 3$

This alternative embodiment performs best when the steps taken to reduce the objectionability of the noise appearance of the output image increase in magnitude as the path number increases. Note also that $T_1 < T_2 < T_3$.

Figure 7:
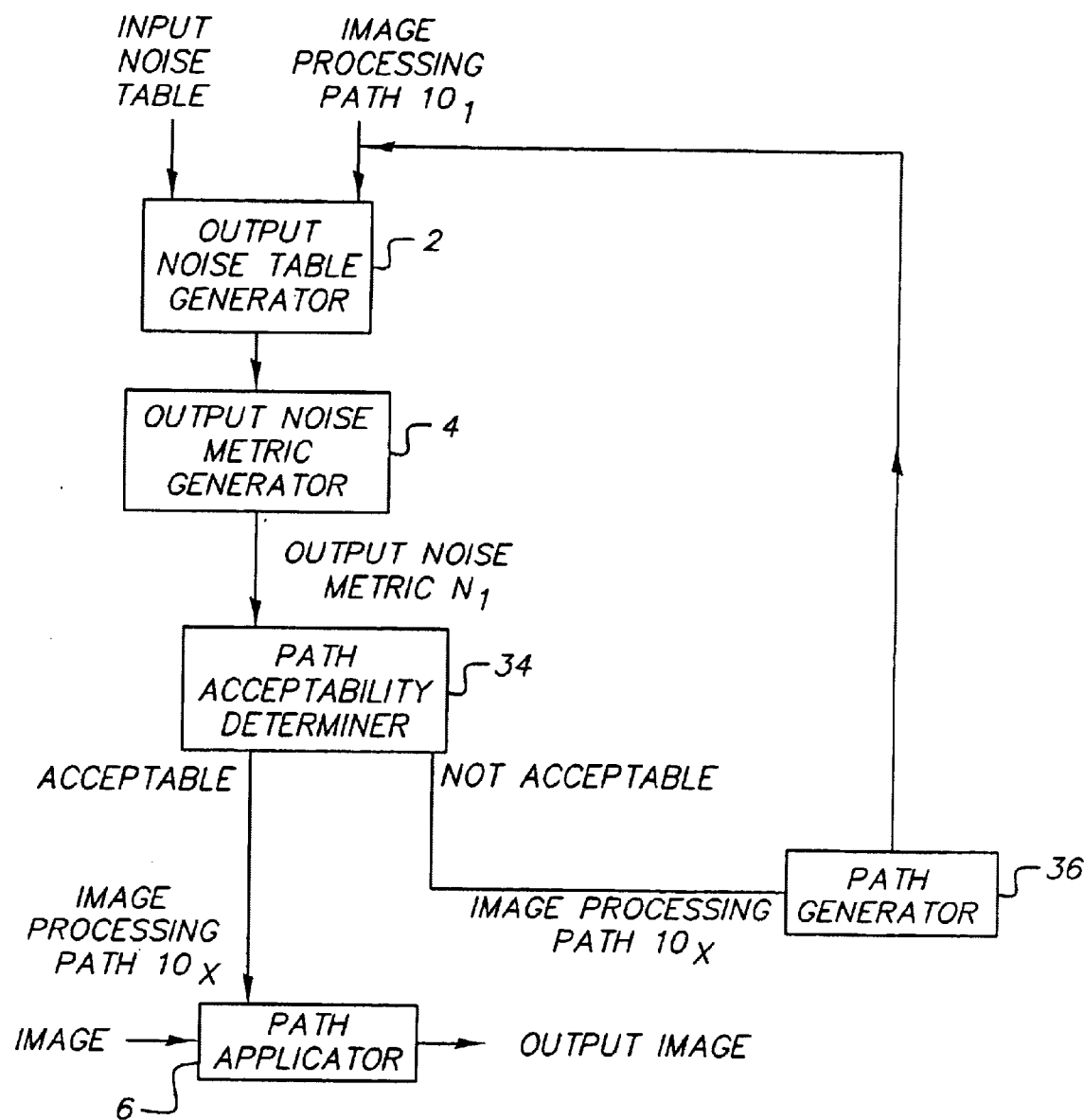
FIG. 7 is a schematic block diagram illustrating a further alternative embodiment of the present invention.

FIG. 7 shows a further alternative embodiment where the path selector 32 is replaced by a path acceptability determiner 34 and a path generator 36. This embodiment describes a method by which iteration is used to arrive at the selected image processing path $10_x$. As previously described, an output noise metric $N_1$ is computed by considering the base image processing path $10_1$ by the output noise table generator 2 and the output noise metric generator 4. This output noise metric is input to the path acceptability determiner 34. If the output noise metric is below the threshold $T_1$, then the output image produced by the processing path is acceptable and the base image processing path 10, is selected as the selected image processing path $10_x$. Otherwise, the path generator 36 generates a second image processing path by either modifying an existing image transform 20 or adding or removing existing image transforms 20. The image processing path 10 output by the path generator 36 is then input to the output noise table generator 2 for producing an output noise table which is input to the output noise metric generator 4 for producing an output noise metric. This output noise metric is then input to the path acceptability determiner 34 to determine if the second image processing path should be accepted. The operation of the path acceptability determiner 34 may be described by the following equations:

If $(N_p < T_1)$ image processing path is accepted as selected image processing path $10_x$ Else image processing path is not accepted.

The path generator 34 operates in a deterministic manner based on a set of rules. Each iteration of the path generator 34 produces an image processing path $10_p$ which takes additional or higher magnitude steps to reduce the noise appearance on the output image. For example, as previously stated, the exposure correction applied by the balance applicator 44 may be iteratively decreased (in steps of 0.1 stops, for example) by adjusting an adjustable parameter to achieve each image processing path $10_p$ created by the path generator 36. Thus, each image processing path $10_p$ would produce a darker (and likely less noisy appearing) output image.

In addition, the contrast adjustor 46 applies a dynamic range compression to the image. While this operation generally results in an improved output image, occasionally the noise appearance in the output print is objectionable due to the fact that the dark regions of the image are lightened, increasing noise visibility. The degree of dynamic range compression is controlled by the slope of the LUT created by the contrast adjustor 46. Each image processing path $10p$ created by the path generator can increase the limit on the allowable minimum slope of the LUT created by the contrast adjustor 46 beginning with the limit used by the base image processing path (preferably 0.3) in small increments (preferably 0.05) up to a limit (preferably 1.0, which essentially prevents the contrast adjustor 46 from having an effect.) Increasing the limit on the allowable minimum slope (the adjustable parameter) allows less dynamic range compression which ensures darker shadows with less visible noise.

The change in slope limit may be imposed only on the low intensities of the image, for example. Note that limits must be placed on the operation of the path generator in order to maintain acceptable output image quality. For example, although an image may be balanced so dark that the output image appears totally and uniformly black and is noiseless, that output image will not be of acceptable quality. Thus, it must be recognized in the design of the path generator 34 that there exists a trade-off between noise appearance and the deviation from the base image processing path 10x.

The present invention has been described with reference to a preferred embodiment. Changes may be made to the preferred embodiment without deviating from the scope of the present invention. For example, in the preferred embodiment, the path selector 32 selects an image processing path 1ox based solely on output noise metrics of one or more image processing paths 10p. However, those skilled in the art will recognize that the path selector may operate on any number of computed image metrics in addition to the output noise metric. For example the path selector may also take into account the maximum local contrast such as described in U.S. Pat. No. 5,363,209 issued Nov. 8, 1994 to Eschbach et al. Such modifications to the preferred embodiment do not co significantly deviate from the scope of the present invention.

PARTS LIST 2 output noise table generator
4 output noise metric generator
6 path applicator
$10_p$ image processing path p
$20_m$ image transform m
32 path selector
34 Path acceptability determiner
36 path generator
42 imaging device response linearizer
44 balance applicator
46 contrast adjustor
48 renderer
52 human visual system modeler

What is claimed is:

1. A method for processing an image based on noise appearance in the image, comprising the steps of:
    a) forming a noise table representing noise magnitude vs. intensity of the image;
    b) providing a plurality of potential image processing paths, each path having at least one image transform;
    c) modifying the noise table according to the image transform(s) in the at least one image processing path to produce an output noise table;
    d) generating a noise metric from the output noise table, said noise metric representing the noise appearance of the image processed by the at least one image processing path;
    e) selecting one of the plurality of potential image processing paths based on the noise metric; and
    f) applying the selected image processing path to the image.

2. The method claimed in claim 1, wherein the potential image processing paths differ with respect to image balance.

3. The method claimed in claim 1, wherein the selected image processing path is selected by determining the potential image processing path with the smallest output noise metric.

4. The method claimed in claim 1, wherein the selected image processing path is selected by determining the image processing path with the greatest output noise metric that is also less than a target output noise metric.

5. The method claimed in claim 1, wherein one of the potential image processing paths is a base image processing path that is selected when the noise metric is in a predetermined range.

6. The method claimed in claim 1, wherein the step of selecting one of the plurality of potential image processing paths, includes the steps of:
    e1) calculating an output image quality as a function of the output noise metric; and
    e2) selecting an image processing path based on the output image quality.

7. The method claimed in claim 1, wherein the noise table represents the noise magnitude vs. intensity characteristics of a system used to capture the image.

8. A method for processing an image based on noise appearance in the image, comprising the steps of:
    a) forming a noise table representing noise magnitude vs. intensity of the image;
    b) providing an image processing path having at least one image transform;
    c) modifying the noise table according to the image transform(s) in the image processing path to produce an output noise table;
    d) generating a noise metric from the output noise table, said noise metric representing the noise appearance of the image processed by the image processing path; and
    e) comparing the noise metric to a predefined threshold and modifying the image processing path and repeating steps c) through e) if the noise metric is greater than the predetermined threshold.

9. The method claimed in claim 8, wherein the image processing path is modified by shifting the image balance.

10. The method claimed in claim 8, wherein the noise table represents the noise magnitude vs. intensity characteristics of a system used to capture the image.

11. A method for processing an image based on noise appearance in the image, comprising the steps of:
    a) forming a noise table representing noise magnitude vs. intensity of the image;
    b) providing an image transform having an adjustable parameter;
    c) modifying the noise table according to the image transform to produce an output noise table;
    d) generating a noise metric from the output noise table, said noise metric representing the noise appearance of the image processed by the image transform; and
    e) comparing the noise metric to a predefined threshold and modifying the adjustable parameter of the image transform and repeating steps c) through e) if the noise metric is greater than the predetermined threshold.

12. The method claimed in claim 11, wherein the image transform performs dynamic range compression, and the adjustable parameter controls a slope of compression.

13. The method claimed in claim 12, wherein the image transform performs dynamic range compression, and the adjustable parameter controls an allowable minimum slope of compression.

14. The method claimed in claim 12, wherein the image transform performs dynamic range compression, and the adjustable parameter controls an allowable minimum slope of compression only on low intensities of the image.

15. The method claimed in 11, wherein the image transform is an image balancing transform and the adjustable parameter is an exposure offset.

16. The method claimed in 11, wherein the image transform is a noise filter and the adjustable parameter is a filter window size.

17. The method claimed in claim 11, wherein the noise table represents the noise magnitude vs. intensity characteristics of a system used to capture the image.

18. A system for processing an image based on noise appearance in the image, comprising:
- a) means for forming a noise table representing noise magnitude vs. intensity of the image;
- b) means for providing a plurality of potential image processing paths, each path having at least one image transform;
- c) means for modifying the noise table according to the image transform(s) in the at least one image processing path to produce an output noise table;
- d) means for generating a noise metric from the output noise table, said noise metric representing the noise appearance of the image processed by the at least one image processing path;
- e) means for selecting one of the plurality of potential image processing paths based on the noise metric; and
- f) means for applying the selected image processing path to the image.

19. The system claimed in claim 18, wherein the potential image processing paths differ with respect to image balance.

20. The system claimed in claim 18, wherein the selected image processing path is selected by determining the potential image processing path with the smallest output noise metric.

21. The system claimed in claim 18, wherein the selected image processing path is selected by determining the image processing path with the greatest output noise metric that is also less than a target output noise metric.

22. The system claimed in claim 18, wherein the one of the potential image processing paths is a reject path.

23. The system claimed in claim 18, wherein one of the potential image processing paths is a base image processing path that is selected when the noise metric is in a predetermined range.

24. The method claimed in claim 18, wherein the means for selecting one of the plurality of potential image processing paths, includes means for:
- e1) calculating an output image quality as a function of the output noise metric; and
- e2) selecting an image processing path based on the output image quality.

25. The method claimed in claim 18, wherein the noise table represents the noise magnitude vs. intensity characteristics of a system used to capture the image.

* * * * *